Patented Dec. 20, 1938

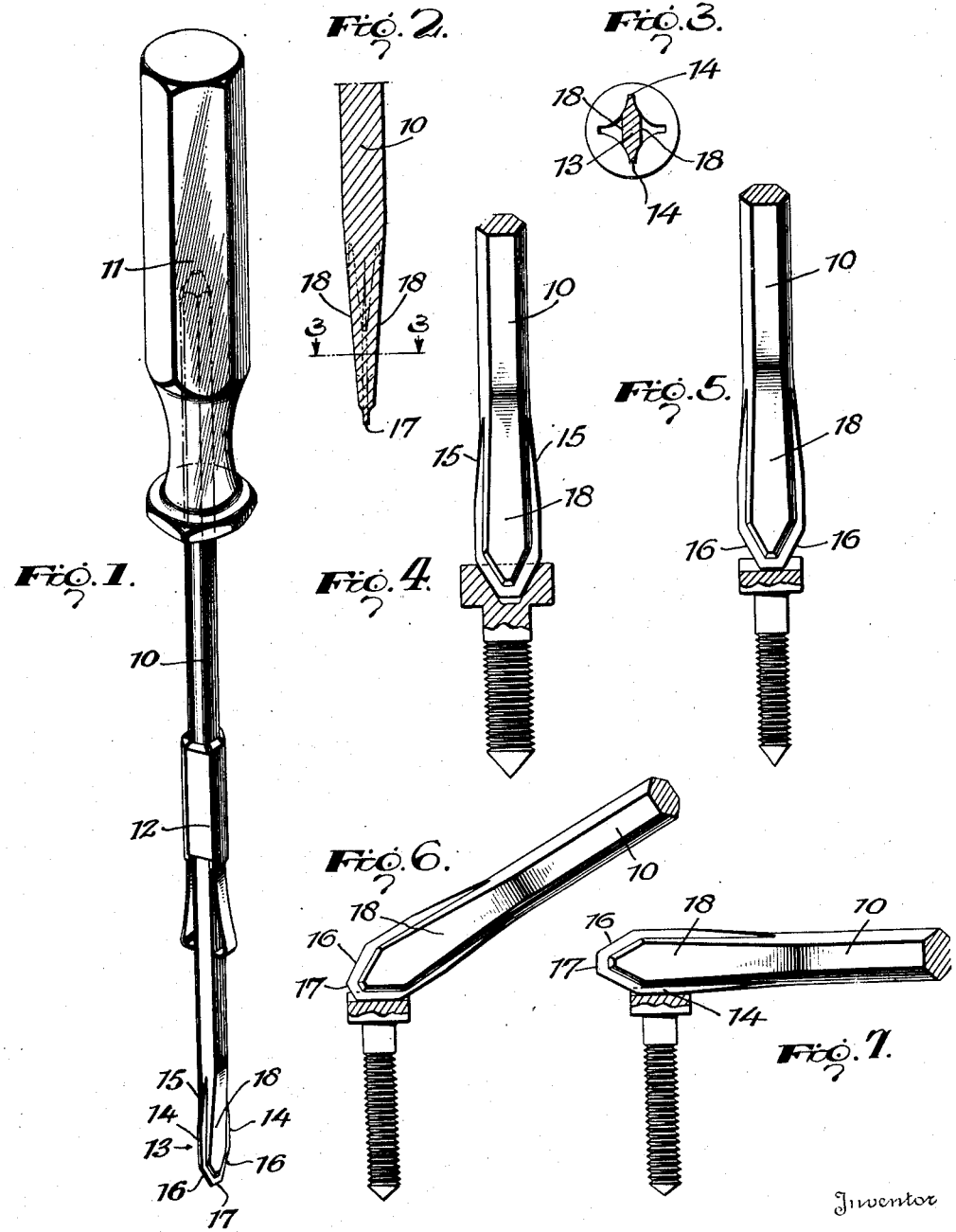

2,141,072

UNITED STATES PATENT OFFICE 2,141,072

SCREW DRIVER

Rudolph J. Velepec, Rochester, N. Y., assignor to Upson Brothers, Inc., Rochester, N. Y., a corporation of New York Application December 23, 1937, Serial No. 181,434

1 Claim. (Cl. 145—50)

The present invention relates generally to screw drivers, and has for its primary object the provision of a screw driver which may be applied with equal facility to the manipulation of screws having slotted heads and those screws, the heads of which are axially apertured, usually with tapering sockets, to defeat ready accidental displacement of the screw drivers from the screw head in the act of turning the screw into or out of place.

The usual screw driver with its plain flat tapering head is very well known in connection with its use on slotted screw heads, and it is also well known that with certain limitations as to matters of size, the ordinary screw driver will function in connection with an axially apertured screw head. In the latter case, however, full cooperation with the screw driver and the screw is only obtained where the bit of the driver is fashioned to closely conform to and interfit the axial aperture of the screw head.

According to the present invention it is proposed that the bit shall be flattened from one end of the shank to an extent sufficient to form a laterally enlarged screw engaging head, and in further accordance with the invention, this head is generally of truncated spear shape, with abruptly tapering side edges and a terminal transverse edge, all fashioned for ready association with the slot of an ordinary screw head as well as for a substantial extension into the axial openings of screw heads of a newer type.

The invention also proposes that the sides of the bit include parallel longitudinal screw slot engaging edges extending rearwardly from the abruptly inclined edges and that the flat bit be reinforced by ribs integral with and flowing forwardly from the shank, to a point sufficient not only for purposes of reinforcement, but to actively cooperate with the bit or head in its cooperation with an axially apertured screw head, and without interfering with the useful application of each of the longitudinal inclined and transverse edges of the bit to the slotted heads of ordinary screws.

With the above in mind, the invention resides in the features to be now described in detail with reference to the accompanying drawing, which forms a part of the specification, and in which Fig. 1 is a perspective view of the improved screw driver.

Figs. 2 and 3 are respectively a longitudinal sectional view and a transverse sectional view through the bit and a portion of the shank, and Figs. 4 to 7, inclusive, are side views showing the bit and a portion of the shank as applied in different positions to screws of different types.

Referring now to these figures, and particularly to Figs. 1, 2 and 3, there is shown a screw driver including a shank 10, one end of which is secured within a suitable handle 11. It is, of course, to be understood that the shank 10 may be of various lengths and it is to be observed from Fig. 1 that in connection with the shank there is used a screw holder generally indicated at 12, and of the type described and claimed in my Patents No. 1,641,307, dated September 6, 1927, and No. 1,791,771, dated February 10, 1931.

According to the present invention, the free end of the shank 10 is drawn out to form a laterally enlarged head, generally indicated at 13, which constitutes the bit. This bit 13 is of substantially greater width than the diameter of the shank 10 and is, generally speaking, of truncated spear shape, being substantially flat and presenting in its rear portion, longitudinal parallel side edges 14 immediately adjacent the rear portions thereof to the flaring shoulders 15 of the shank.

Forwardly of the longitudinal edges 14 the flat bit head presents abruptly tapering inclined edges 16 which continue forwardly to a relatively short transverse edge 17 resulting from the truncation of the spear shape and centered in the axial plane of the shank.

At its opposite flat faces, the bit head is provided with central longitudinal ribs 18 which are integral therewith and with the shank 10 and which project forwardly from the latter for the major portion of the length of the bit and gradually taper in their forward extension, finally substantially merging into the flat surfaces of the bit head at their extremities where they terminate substantially short of the transverse short forward edge of the bit.

The result of this structure is that the laterally enlarged flattened head which constitutes the bit in the present instance is very substantially reinforced by the ribs 18 so positioned as to cooperate with the inclined side edges 16 of the bit in interfitting various sizes of the newer types of axially apertured screw heads, one of which is shown in Fig. 4. It is to be observed, however, that the longitudinal edges 14, inclined edges 16 and the forward transverse and relatively short edge 17, are all finished to engage within and cooperate with the slots of the heads of ordinary screws and that by reason of the termination of the ribs 18 short of the transverse edge 17 at the extremity of the bit and the location of these ribs centrally between the longitudinal sides edges 14 and inclined edges 16, these edges are left free for the manipulation of screws having the usual slotted heads. It will thus be observed from Figs. 5, 6 and 7 that with the ordinary screw having a transversely slotted head, the screw driver of the present invention is capable of application in various positions. Fig. 5 shows use of the screw driver in axial alignment of the screw, its short terminal edge 17 extending into the screw slot. Fig. 6 shows the use of the screw driver in an inclined position in which one of the inclined edges 16 engages the slot of a screw head, and Fig. 7 shows application of the screw driver to the usual slotted head screw in a right angular position wherein one of the longitudinal side edges 14 cooperates with the screw head.

Thus it will be observed that the improved screw driver will not only present the advantage of adaptability to axially apertured screw heads as well as those of the usual cross slotted type, but also lends itself to convenient and effective use with a variety of sizes of screws of each of these types.

What is claimed is:

A screw driver adapted to function with various sizes of slotted and axially apertured screw heads, including a shank having at one end a generally flat head of approximately truncated spear shape and presenting inclined forwardly tapering screw slot engaging edges and a relatively short transverse terminal edge of a length substantially less than the diameter of the shank, and forming with said tapering edges a wedge for interfitting various sizes of axially apertured screws, said head having outstanding ribs centrally of and longitudinally along its flat faces, projecting along the major portion of the length of the head and said ribs presenting shoulders paralleling, and terminating short of and spaced from, the said inclined and transverse edges of the head a distance substantially equal to the depth of a screw slot.

RUDOLPH J. VELEPEC.